(12) United States Patent
Budagavi et al.

(10) Patent No.: US 10,769,797 B2
(45) Date of Patent: Sep. 8, 2020

(54) VIRTUAL REALITY EXPERIENCE SHARING

(71) Applicant: Samsung Electronics Co., Ltd, Suwon-si (KR)

(72) Inventors: Madhukar Budagavi, Plano, TX (US); Imed Bouazizi, Frisco, TX (US); Youngkwon Lim, Allen, TX (US); Andrew Joseph Dickerson, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/801,174

(22) Filed: Nov. 1, 2017

(65) Prior Publication Data
US 2018/0189958 A1 Jul. 5, 2018

Related U.S. Application Data

(60) Provisional application No. 62/442,718, filed on Jan. 5, 2017, provisional application No. 62/444,840, filed
(Continued)

(51) Int. Cl.
*G06T 7/20* (2017.01)
*G06T 19/00* (2011.01)
(Continued)

(52) U.S. Cl.
CPC ............... *G06T 7/20* (2013.01); *G06F 1/163* (2013.01); *G06F 1/1626* (2013.01);
(Continued)

(58) Field of Classification Search
CPC .......... H04N 21/2353; H04N 21/4788; H04N 21/6587; H04N 21/8455; H04N 21/8543;
(Continued)

(56) References Cited

U.S. PATENT DOCUMENTS

2010/0088726 A1* 4/2010 Curtis .................. G11B 27/034
725/45
2010/0125876 A1* 5/2010 Craner ................... H04N 5/765
725/61
(Continued)

FOREIGN PATENT DOCUMENTS

JP 2005-050081 A1 2/2005
JP 2012-103888 A1 5/2012
(Continued)

OTHER PUBLICATIONS

Choi, B., et al., "Text of ISO/IEC 23000-20 CD Omnidirectional Media Application Format," ISO/IEC JTC1/SC 29/WG11 N16636, Systems, Jan. 2017, Geneva, Switzerland, 48 pages.
(Continued)

*Primary Examiner* — James R Sheleheda (57) ABSTRACT

A UE includes a communication unit, a display, at least one sensor, and a processor. The communication unit receives video from a server and the display renders a portion of the video. The sensor determines a pitch and a yaw of the portion of the video and a processor generates metadata that includes the pitch and the yaw.

20 Claims, 10 Drawing Sheets

Related U.S. Application Data on Jan. 11, 2017, provisional application No. 62/465,883, filed on Mar. 2, 2017.

(51) Int. Cl.

| | | |
|---|---|---|
| *H04N 21/235* | (2011.01) | |
| *G06F 3/01* | (2006.01) | |
| *G06F 1/16* | (2006.01) | |
| *H04N 21/422* | (2011.01) | |
| *H04N 21/4788* | (2011.01) | |
| *H04N 21/81* | (2011.01) | |
| *H04N 21/84* | (2011.01) | |
| *H04N 21/6587* | (2011.01) | |
| *H04N 21/8543* | (2011.01) | |

(52) U.S. Cl.
CPC ............ *G06F 1/1694* (2013.01); *G06F 3/011* (2013.01); *G06F 3/012* (2013.01); *G06T 19/003* (2013.01); *H04N 21/2353* (2013.01); *H04N 21/42222* (2013.01); *H04N 21/4788* (2013.01); *H04N 21/6587* (2013.01); *H04N 21/816* (2013.01); *H04N 21/84* (2013.01); *H04N 21/8543* (2013.01)

(58) Field of Classification Search
CPC ......... G06T 7/20; G06T 19/003; G06F 3/011; G06F 3/012
See application file for complete search history.

(56) References Cited

U.S. PATENT DOCUMENTS

| | | | |
|---|---|---|---|
| 2011/0093492 A1* | 4/2011 | Sull ...................... | G11B 27/034 707/769 |
| 2012/0092348 A1 | 4/2012 | McCutchen | |
| 2012/0092371 A1 | 4/2012 | Miyashita et al. | |
| 2015/0113581 A1* | 4/2015 | McArdle ................. | H04N 21/84 725/115 |
| 2015/0243078 A1* | 8/2015 | Watson .................... | A63F 13/86 345/547 |
| 2015/0271453 A1* | 9/2015 | Chuang ............ | G08B 13/19619 348/39 |
| 2016/0284136 A1* | 9/2016 | Johnston ............... | G06T 19/006 |
| 2016/0353090 A1 | 12/2016 | Esteban et al. | |
| 2016/0381398 A1 | 12/2016 | Saxena et al. | |
| 2017/0150230 A1* | 5/2017 | Shimura ................. | G06T 19/00 |
| 2018/0025753 A1* | 1/2018 | Gewickey ............ | H04N 13/025 386/223 |
| 2018/0059783 A1* | 3/2018 | van Hoff ............... | G06T 3/4038 |
| 2018/0074679 A1* | 3/2018 | Wang .................. | H04L 65/1069 |
| 2018/0121069 A1* | 5/2018 | DiVerdi ............. | G06F 3/04847 |
| 2018/0189958 A1* | 7/2018 | Budagavi ............... | H04N 21/84 |
| 2018/0255290 A1* | 9/2018 | Holzer ................. | H04N 13/279 |

FOREIGN PATENT DOCUMENTS

| | | |
|---|---|---|
| KR | 10-2012-0010041 A | 2/2012 |
| WO | 2016002445 A1 | 1/2016 |
| WO | 2018052251 A1 | 3/2018 |

OTHER PUBLICATIONS

ISA/KR, "International Search Report and Written Opinion of the International Searching Authority," International Application No. PCT/KR2018/000279, dated Apr. 11, 2018, 9 pages.

European Patent Office, "Supplementary European Search Report," Application No. EP 18736527.5, dated Sep. 13, 2019, 6 pages.

Korean Intellectual Property Office, Notification of Reason for Refusal regarding Application No. 10-2019-7017148, dated Jun. 30, 2020, 9 pages.

* cited by examiner

VIRTUAL REALITY EXPERIENCE SHARING

CROSS-REFERENCE TO RELATED APPLICATION AND CLAIM OF PRIORITY

This application claims priority under 35 U.S.C. § 119(e) to U.S. Provisional Patent Application No. 62/442,718 filed on Jan. 5, 2017, U.S. Provisional Patent Application No. 62/444,840 filed on Jan. 11, 2017, and U.S. Provisional Patent Application No. 62/465,883 filed on Mar. 2, 2017. The above-identified provisional patent applications are hereby incorporated by reference in their entirety.

TECHNICAL FIELD

This disclosure relates generally to virtual reality. More specifically, this disclosure relates to sharing the virtual reality experience among multiple users.

BACKGROUND

Virtual reality experiences are becoming prominent. For example, 360° video is emerging as a new way of experiencing immersive video due to the ready availability of powerful handheld devices such as smartphones. 360° video enables immersive "real life", "being there" experience for consumers by capturing the 360° degree view of the world. Users can interactively change their viewpoint and dynamically view any part of the captured scene they desire. Display and navigation sensors track head movement in real-time to determine the region of the 360° video that the user wants to view.

Social media sites allow for sharing of personalized video experiences. For example, users share and watch 12 billion minutes of gameplay capture video per month. The videos that are shared are screen captures of the player's view. Different users might like to view different parts of 360° video and might want to share their personalized viewpoints with friends and family. Thus, there is a need for efficiently sharing a user's viewpoint with other users.

Personalized video experiences can be shared by sharing user viewpoint trajectories or user specified region of interests (ROI). A single viewport/ROI trajectory consists of a sequence of viewports/ROIs, one viewport/ROI for every frame of video. There can be multiple viewport/ROI trajectories for a given 360 degrees video—the number of viewport/ROI trajectories depends on the number of users who view the 360 degrees video and want to share their personalized viewport/ROI trajectory. This number could easily reach multiple of hundreds or thousands. So efficient mechanisms for sharing of viewport/ROI trajectories are needed.

SUMMARY

The present disclosure relates to devices and methods for sharing user viewpoints in 360° video.

In a first embodiment, a user equipment (UE) includes a communication unit, a display, at least one sensor, and a processor. The communication unit is configured to receive video from a server and the display is configured to render a portion of the video. The at least one sensor is configured to determine a pitch and a yaw of the portion of the video and the processor is configured to generate metadata where the metadata includes the pitch and the yaw.

In a second embodiment, a user equipment (UE) includes a communication unit, a display, and a processor. The communication unit is configured to receive video from a server and the display is configured to display a graphical user interface (GUI), the GUI including a rendering of a portion of the video and an object. The processor is configured to determine a pitch and a yaw when the object is selected by a user and generate metadata where the metadata includes the pitch and the yaw.

In a third embodiment, a method for sharing a portion of a video includes receiving video from a server and rendering a portion of the video. A pitch and a yaw are determined for the portion of the video. Metadata including the pitch and the yaw is then generated.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

FIGS. 1 through 10, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged device or system.

Figure 1:
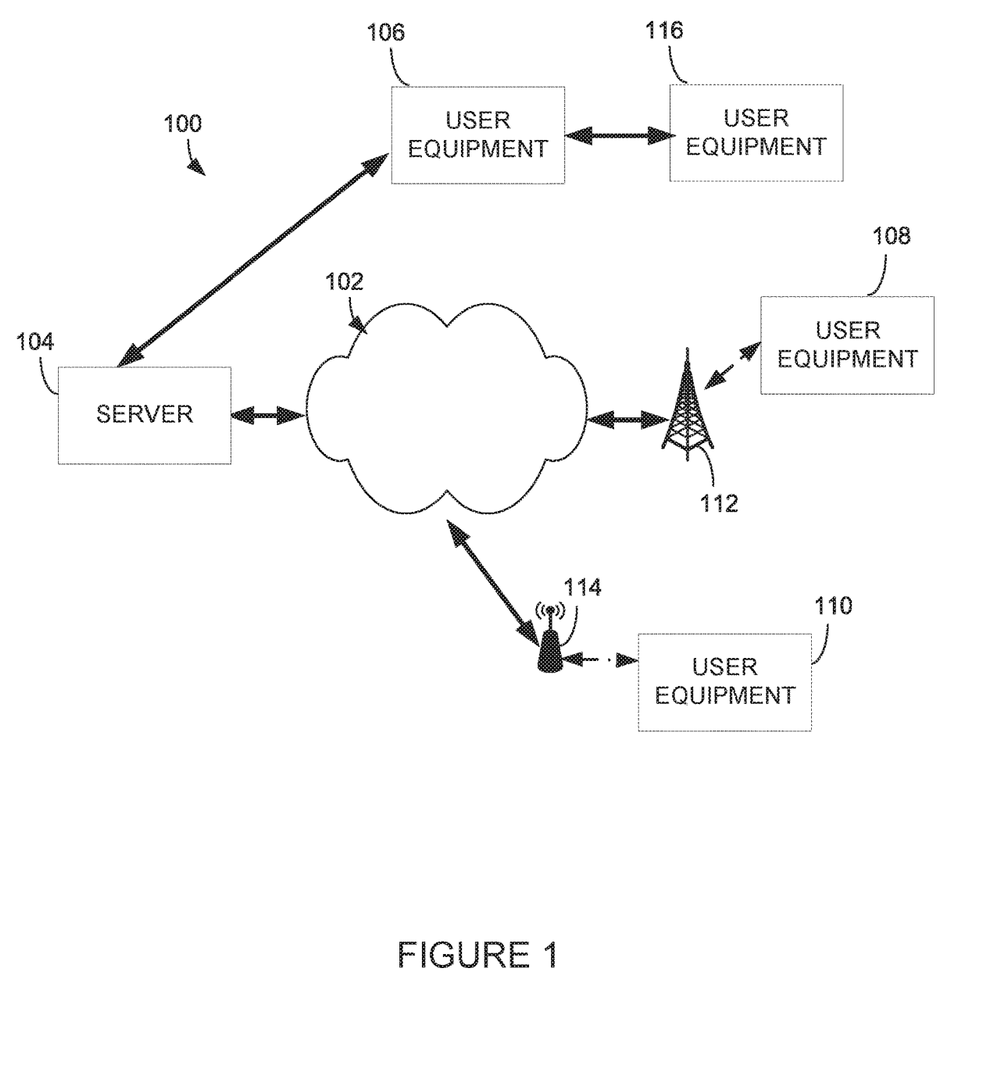
FIG. 1 illustrates an example computing system according to this disclosure.

FIG. 1 illustrates an example computing system 100 according to this disclosure. The embodiment of the computing system 100 shown in FIG. 1 is for illustration only. Other embodiments of the computing system 100 could be used without departing from the scope of this disclosure.

As shown in FIG. 1, the system 100 includes a network 102, which facilitates communication between various components in the system 100. For example, the network 102 may communicate Internet Protocol (IP) packets, frame relay frames, Asynchronous Transfer Mode (ATM) cells, or other information between network addresses. The network 102 may include one or more local area networks (LANs), metropolitan area networks (MANs), wide area networks (WANs), all or a portion of a global network such as the Internet, or any other communication system or systems at one or more locations.

The network 102 facilitates communications between the server 104 and various UEs 106-110. The UEs 106-110 may be, for example, a smartphone, tablet, laptop, personal computer, a wearable device, or head-mounted display (HMD). The server 104 includes any suitable computing or processing device that can provide computing services for one or more client devices. Each server 104 could, for example, include one or more processing devices, one or more memories storing instructions and data, and one or more network interfaces facilitating communication over the network 102.

In this example, the UE 106 can communicate directly with the server 104 using WI-FI®, BLUETOOTH®, or any short range communication protocols. Some UEs 108 and 110 communicate indirectly with the network 102. For example, the UE 108 communicates via one or more base stations 112, such as cellular base stations or eNodeBs. Also, the UE 110 communicates via one or more wireless access points 114, such as IEEE 802.11 wireless access points. Note that these are for illustration only and that each client device could communicate directly with the network 102 or indirectly with the network 102 via any suitable intermediate device(s) or network(s).

As described in more detail below, the server 104 receives metadata regarding user's viewpoint for a 360° video and transmits the metadata with the 360° video to one or more users. In some embodiments, an UE, such as UE 106, may transmit the metadata directly to another UE, such as UE 116.

Although FIG. 1 illustrates one example of a computing system 100, various changes may be made to FIG. 1. For example, the system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
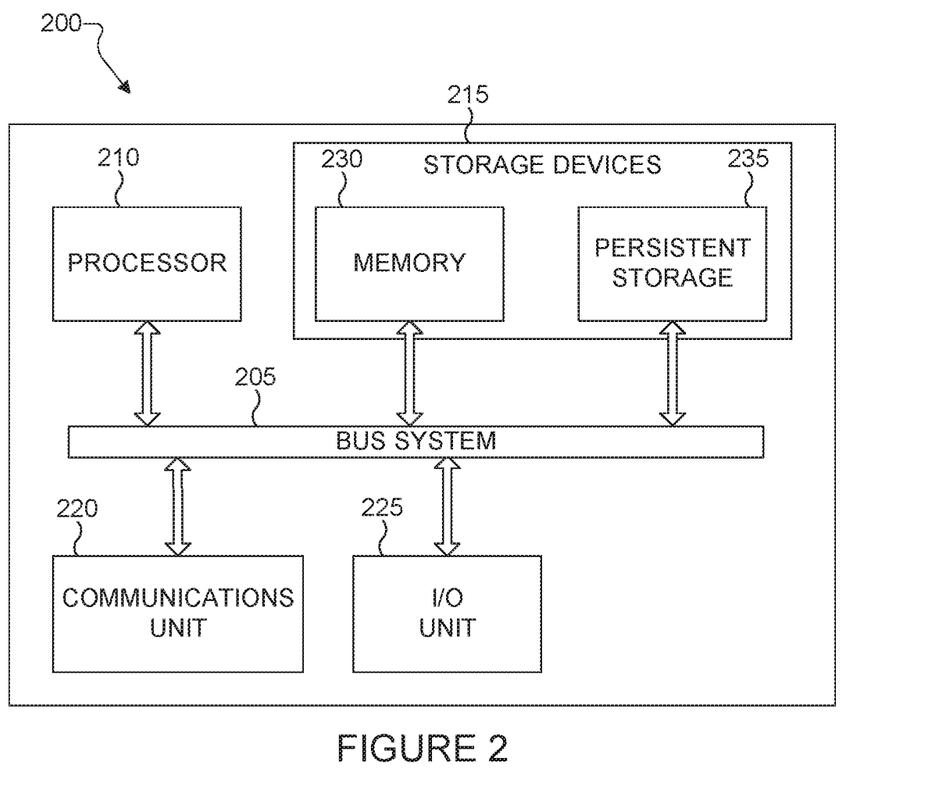
FIG. 2 illustrates an example server in a computing system according to this disclosure.
Figure 3:
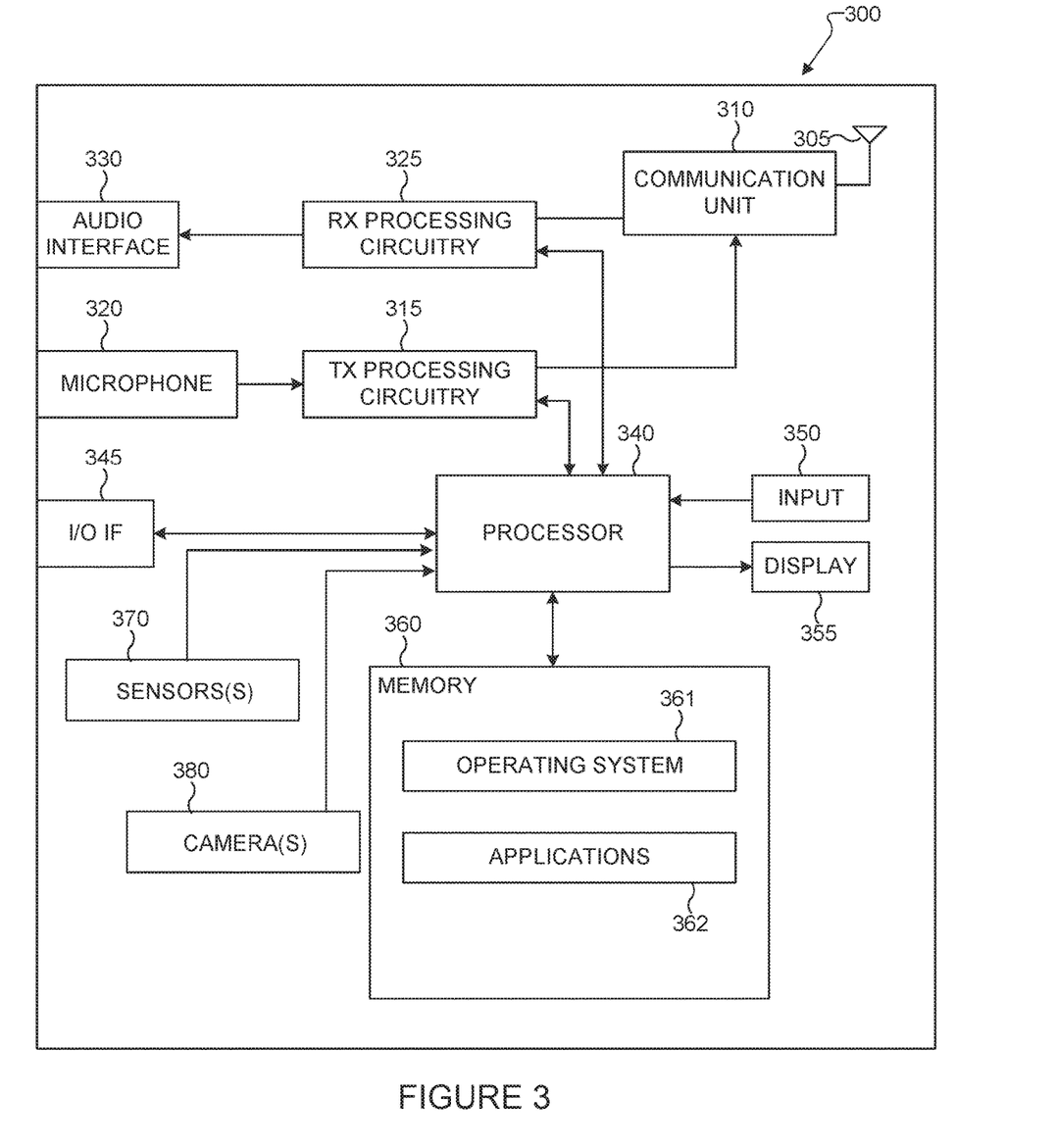
FIG. 3 illustrates an example user equipment (UE) according to this disclosure.

FIGS. 2 and 3 illustrate example devices in a computing system according to this disclosure. In particular, FIG. 2 illustrates an example server 200, and FIG. 3 illustrates an example UE 300. The server 200 could represent the server 104 in FIG. 1, and the UE 300 could represent the UEs 106-110 in FIG. 1.

As shown in FIG. 2, the server 200 includes a bus system 205, which supports communication between at least one processor 210, at least one storage device 215, and at least one communications unit 220.

The processor 210 executes instructions that may be loaded into a memory 230. The processor 210 may include any suitable number(s) and type(s) of processors or other devices in any suitable arrangement. Example types of processors 210 include microprocessors, microcontrollers, digital signal processors, field programmable gate arrays, application specific integrated circuits, and discreet circuitry.

The memory 230 and a persistent storage 235 are examples of storage devices 215, which represent any structure(s) capable of storing and facilitating retrieval of information (such as data, program code, and/or other suitable information on a temporary or permanent basis). The memory 230 may represent a random access memory or any other suitable volatile or non-volatile storage device(s). The persistent storage 235 may contain one or more components or devices supporting longer-term storage of data, such as a ready only memory, hard drive, Flash memory, or optical disc. Memory 230 stores an application thereon that is used to control one or more functions of the server 200.

The communications unit 220 supports communications with other systems or devices. For example, the communications unit 220 could include a network interface card or a wireless transceiver facilitating communications over the network 102. The communications unit 220 may support communications through any suitable physical or wireless communication link(s).

In some embodiments, the server 200 may include an I/O unit 225 that allows for input and output of data. For example, the I/O unit 225 may provide a connection for user input through a keyboard, mouse, keypad, touchscreen, or other suitable input device. The I/O unit 225 may also send output to a display, printer, or other suitable output device.

Although FIG. 2 illustrates one example of a server 200, various changes may be made to FIG. 2. For example, the server 200 could include any number of each component shown in FIG. 2.

Figure 4:
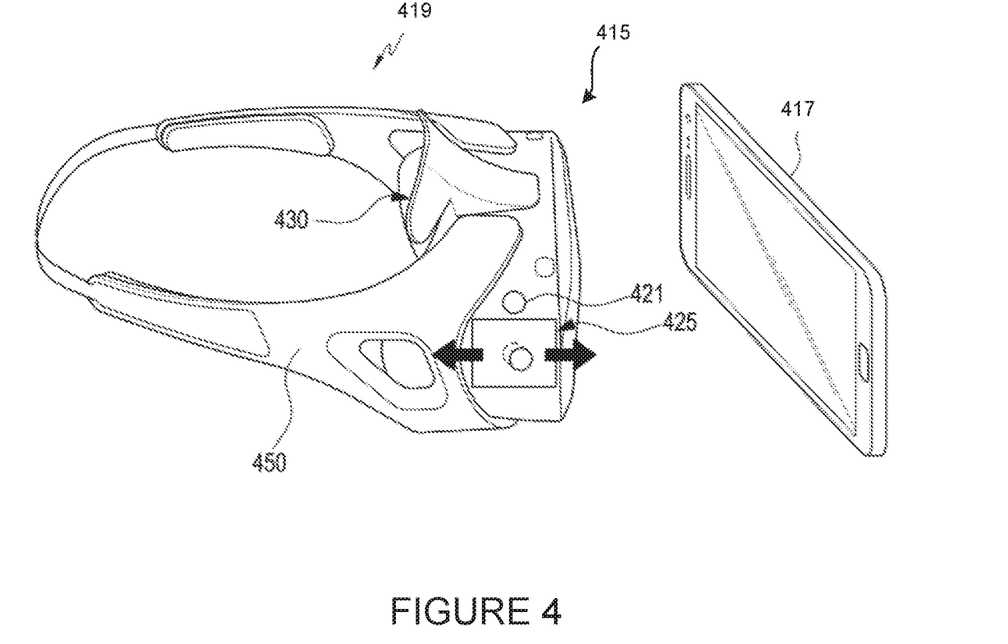
FIG. 4 illustrates a perspective view of a head-mounted display (HMD) according to this disclosure.

FIG. 3 illustrates an example UE 300 according to this disclosure. The embodiment of the UE 300 illustrated in FIG. 3 is for illustration only, and the UEs 106-110 of FIG. 1 could have the same or similar configuration. However, UEs come in a wide variety of configurations, and FIG. 3 does not limit the scope of this disclosure to any particular implementation of an UE. In one or more embodiments of this disclosure, the UE 300 may be replaced by a HMD as shown in FIG. 4.

As shown in FIG. 3, the UE 300 includes a communication unit 310. The communication unit 310 may include, for example, a RF transceiver, a Bluetooth transceiver, or a Wi-Fi transceiver. The UE 300 may also include transmit (TX) processing circuitry 315, a microphone 320, and receive (RX) processing circuitry 325. The UE 300 also includes an audio interface or speaker 330, a processor 340, an input/output (I/O) interface (IF) 345, an input 350, a display 355, and a memory 360. The memory 360 includes an operating system (OS) program 361 and one or more applications 362.

The communication unit 310 may receive an incoming RF signal such as, e.g., a BLUETOOTH® signal or a WI-FI® signal. The "communication unit 310" may down convert the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The communication unit 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the basic OS program 361 stored in the memory 360 in order to control the overall operation of the UE 300. For example, the processor 340 could control the reception of forward channel signals and the transmission of reverse channel signals by the communication unit 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360. The processor 340 can move data into or out of the memory 360 as required by an executing process. In some embodiments, the processor 340 is configured to execute the applications 362 based on the OS program 361 or in response to signals received from eNBs or an operator. The processor 340 is also coupled to the I/O interface 345, which provides the UE 300 with the ability to connect to other devices such as laptop computers and handheld computers. The I/O interface 345 is the communication path between these accessories and the processor 340.

The processor 340 is also coupled to the input 350 and the display 355. The operator of the UE 300 can use the input 350 (e.g., keypad, touchscreen, button etc.) to enter data into the UE 300. The display 355 may be a liquid crystal display, a light-emitting diode (LED) display, an optical LED (OLED), an active matrix OLED (AMOLED), a transparent or opaque display such one or more lenses on a pair of augmented reality glasses where one or more images maybe projected onto or displayed using the lens, or other display capable of rendering text and/or at least limited graphics, such as from web sites. In one embodiment, the input 350 is a touchscreen. The touchscreen could include a touch panel, a (digital) pen sensor, a key, or an ultrasonic input device. The touchscreen could recognize, for example, a touch input in at least one scheme among a capacitive scheme, a pressure sensitive scheme, an infrared scheme, or an ultrasonic scheme. The touchscreen could also include a control circuit. In the capacitive scheme, the touchscreen could recognize touch or proximity.

The memory 360 is coupled to the processor 340. Part of the memory 360 could include a random access memory (RAM), and another part of the memory 360 could include a Flash memory or other read-only memory (ROM).

UE 300 may further include one or more sensors 370 that can meter a physical quantity or detect an activation state of the UE 300 and convert metered or detected information into an electrical signal. For example, sensor 370 may include one or more buttons for touch input, e.g., on the headset or the UE 300, one or more cameras 380, a gesture sensor, an eye tracking sensor, a gyroscope or gyro sensor, an air pressure sensor, a magnetic sensor or magnetometer, an acceleration sensor or accelerometer, a grip sensor, a proximity sensor, a color sensor (e.g., a Red Green Blue (RGB) sensor), a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, etc. The sensor(s) 370 can further include a control circuit for controlling at least one of the sensors included therein. As will be discussed in greater detail below, one or more of these sensor(s) 370 may be used to control a UI, detect UI inputs, determine the orientation and facing direction of the user for 3D content display identification, etc. Any of these sensor(s) 370 may be located within the UE 300, within a headset configured to hold the UE 300, or in both the headset and UE 300, for example, in embodiments where the UE 300 includes a headset.

UE 300 may also include one or more cameras 380. Camera 380 may be a red, green, blue (RGB) camera or an infrared camera. As will be discussed below, camera 380 may be used to track a user's gaze or movement with regard to the 360° video.

Although FIG. 3 illustrates one example of UE 300, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs).

In the embodiments described herein with regard to FIGS. 4 through 9, each viewport/region of interest (ROI) is associated with metadata that provides a unique ID for the associated viewport/ROI. Viewport/ROI may refer to a viewport, ROI, or both a viewport and ROI. A number ID or a string or an icon/image can be associated with the viewport/ROI. The metadata for efficient transmission of viewport/ROI makes use of temporal redundancy in the viewport/ROI coordinates from one frame to the next. The viewport/ROI may be defined by at least four parameters e.g. (left yaw, right yaw, top pitch, bottom pitch) or (center yaw, center pitch, pitch height, yaw width). Additional parameters such as roll and zoom may also be used. A flag that specifies a fixed size for a ROI displayed in a viewport for the entire video may be used to reduce the number of parameters to represent the viewport/ROI in a frame. The viewport/ROI size is typically determined by the display of the head mounted device (HMD) or screen of an UE such as a smart phone, tablet, personal computer, laptop computer, or the like and remains constant over the entire video. The HMD or UE provides the viewport/ROI size to the server for transmission to another UE when the viewport/ROI is shared.

In the case of an HMD, the head position might be static over several frames as the user looks at a scene. This may be exploited to reduce the amount of data needed for transmitting viewport/ROI trajectories by using e.g. a flag that indicates whether the current frame uses the previous frame viewport/ROI co-ordinates or whether the current frame viewport/ROI co-ordinates are interpolated from neighboring viewport/ROI co-ordinates from anchor frames in the video. Alternate mechanisms could include indicating start and stop times or frame numbers where the viewport/ROI co-ordinates do not change. Delta coding of viewport/ROI co-ordinates between one frame to the next or between viewpoint trajectories of different users could be used too. A predictor (e.g. linear prediction) that uses the past history to predict the viewport/ROI co-ordinates for the current viewport/ROI may be used too to calculate the delta viewport/ROI co-ordinate change. In terms of carriage of metadata for delivery, several existing or new mechanisms can be used such as the SEI message in video elementary bitstream, box in ISOBMFF, etc.

Examples of the 360 degree video experience sharing metadata are provided below. It consists of a combination of static metadata that remains fixed for the entire 360° video and dynamic metadata that varies with time. The metadata below is defined in terms of viewpoint trajectory or viewport/ROI. In some embodiments, the metadata may be defined in terms of ROI. Also the viewport/ROI is assumed to be signaled in the form of (center yaw, center pitch, viewport/ROI height, viewport/ROI width), but the ideas described below can be applied to other representations of the viewport or ROI.

For static metadata:

| Syntax |
|---|
| unsigned int(32) viewpoint_trajectory_id;<br>string        viewpoint_trajectory_name;<br>unsigned int(1) is_fixed_viewport_size_flag; |

-continued

| Syntax |
|---|
| if(is_fixed_viewport_size == 1)<br>{<br>    unsigned int(9) fixed_viewport_height_pitch;<br>    unsigned int(9) fixed_viewport_width_yaw;<br>} |

In the above example syntax for the static metadata, the viewpoint_trajectory_id specifies the numerical identifier for the viewpoint trajectory. The viewpoint_trajectory_name specifies the string identifier for the viewpoint trajectory. The is_fixed_viewport_size equal to 1 specifies that the viewport/ROI size is fixed for the entire video and is_fixed_viewport_size equal to 0 specifies that the viewport/ROI size can vary in the video. The fixed_viewport_height_pitch is the pitch height of the viewport and/or ROI with a fixed size and the fixed_viewport_width_yaw is the yaw width of the viewport and/or ROI with a fixed size.

For dynamic metadata:

| Syntax |
|---|
| unsigned int(2) interpolate_viewport_idc;<br>if(interpolate_viewport_idc == 0)<br>{<br>    unsigned int(9) viewport_center_pitch;<br>    unsigned int(9) viewport_center_yaw;<br>    if(is_fixed_viewport_size == 0)<br>    {<br>        unsigned int(9) viewport_height_pitch;<br>        unsigned int(9) viewport_width_yaw;<br>    }<br>} |

In the above example syntax for the dynamic metadata, interpolate_viewport_idc equal to 0 specifies that the viewport/ROI information for the current frame is transmitted, interpolate_viewport_idc equal to 1 specifies that the viewport/ROI information for the current frame is copied from the previous frame, and interpolate_viewport_idc equal to 2 specifies that the viewport/ROI information for the current frame is linearly interpolated from the viewport/ROI information from the previous and next frames which have interpolate_viewport_idc equal to 0. The viewport_center_pitch is the pitch corresponding to the center of the viewport and/or ROI and the viewport_center_yaw is the yaw corresponding to the center of the viewport and/or ROI. The viewport_height_pitch is the pitch height of the viewport and/or ROI and the viewport_width_yaw is yaw width of the viewport and/or ROI.

FIG. 4 illustrates one example of a head mounted device (HMD) that may be used with various embodiments of the present disclosure. As shown in FIG. 4, an HMD 415 may include an UE 417 and an UE 419 according to an embodiment of the present disclosure. HMD 415 illustrates one example of an UE 300 that may be used with the embodiments of the present disclosure.

The UE 417 may include a display that displays 360° video received from a server, for example, server 104 of FIG. 1.

The UE 417 may store a virtual reality application. For example, the UE 417 may be the UE 300 and include all the features of the UE 300 such as sensors 370 and internally and externally facing cameras 380. The virtual reality application may be an application which can provide a display similar to an actual reality to the user. According to an embodiment, the virtual reality application may display a left eye image and a right eye image corresponding to each of the user's eyes based on a stereo scheme.

The UE 419 according to an embodiment may include a housing 450 provided to be worn on the user's head, a blackout part 430 fixed to the housing and provided at an area corresponding to locations of the user's eyes, and at least one input button 421 provided at one area of the housing 450. The input button 421 may be used to capture a viewport/ROI that a user desires to share. The UE 402 may include an input pad 425 which may receive an input from the user such as a swipe, tap, or other input performed by a user.

In operation, when a user activates or actuates input button 421, sensors 370 determine the center pitch and center yaw of the viewport/ROI. The HMD 415 may then provide the center pitch, center yaw, viewport/ROI size to a server, such as server 104 of FIG. 1. The server then adds the center pitch, center yaw, viewport/ROI size to the metadata of the associated frame or series of frames in the video along with a user ID to identify the user that is sharing the particular viewport/ROI. In other embodiments, the HMD 415 may store the center pitch and center yaw for each frame as the user watches the 360° video and store it in the memory 360 with the corresponding frame ID and user ID. Upon activation of the input button 421, the HMD 415 transmits the stored center pitch, center yaw, frame ID, and user ID to a server to share the user's viewport/ROI with other users. In other embodiments, the user may select the viewport/ROI (center pitch, center size, ROI size) by touch screen input or other mechanisms.

The blackout part 430 provides a seal against external light from entering the space between a user's eyes and the UE 417. Thus, the user may position the user's eyes to fit closely to the blackout part 430 and, accordingly, the user may view the image by the virtual reality application provided from the UE 401 without any interference from external light.

The UE 417 may be coupled to the UE 419. The UE 417 may be connected to the UE 419 through a wire or wirelessly. For example, although the UE 401 may be connected to the UE 419 based on a USB connection. The aforementioned is merely an example and it may be easily understood by those skilled in the art that there is no limitation on the connection if data transmission/reception between the two UEs 417 and 419 is possible through the connection. According to another embodiment, the UE 417 may be directly coupled to the UE 419 without the use of a wire or wireless connection.

Figure 5:
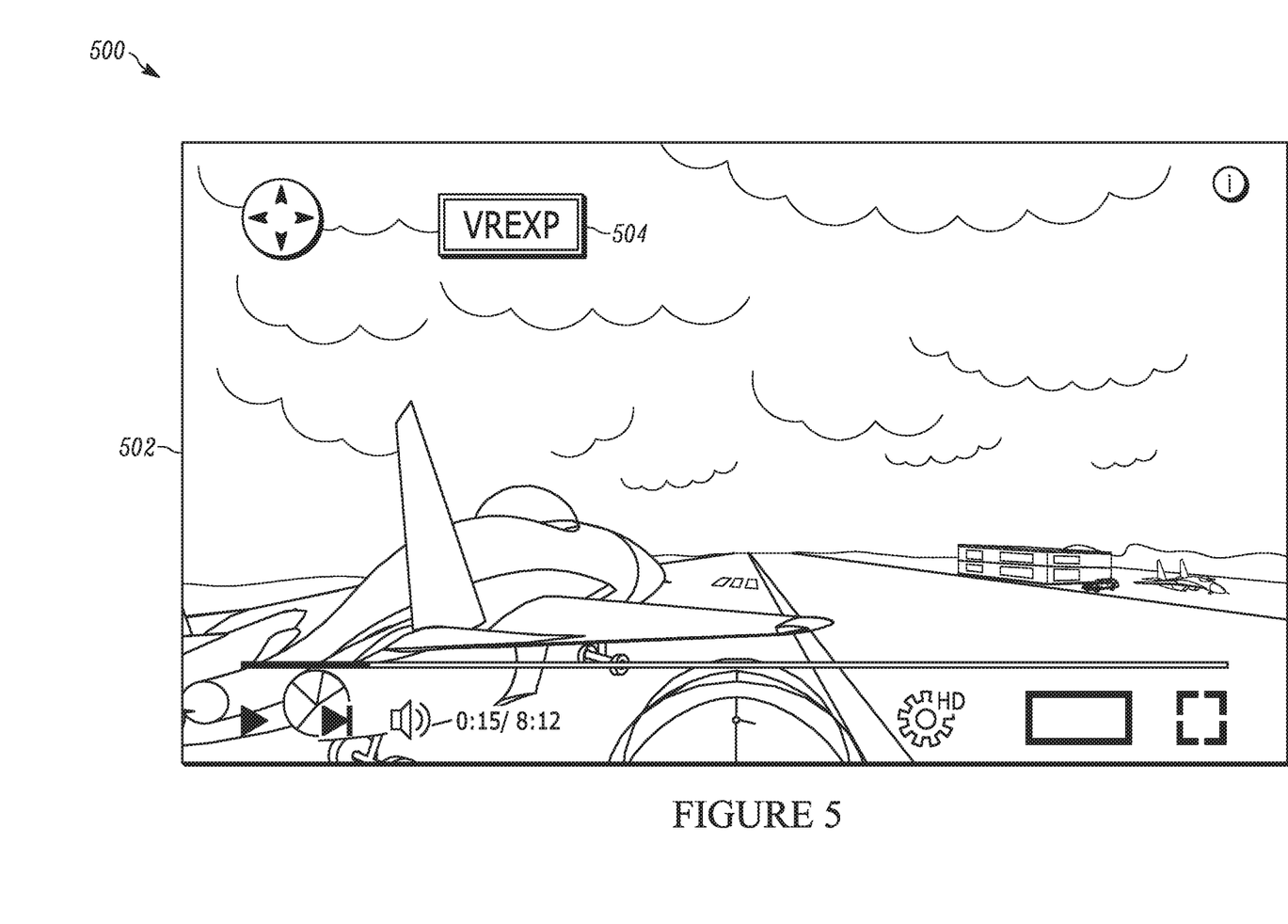
FIG. 5 illustrates an example graphical user interface according to this disclosure.

FIG. 5 illustrates an example graphical user interface (GUI) 500 according to this disclosure. As shown in FIG. 5, the GUI 500 displays a viewport/ROI 502 of a 360° video that may be selected by a user or a default viewport/ROI for the 360° video. The GUI 500 may be displayed on a UE such as UE 300, which may be phone, tablet, laptop computer, desktop computer, or the like. The GUI 500 also includes an object 504 that may be selected by a user to determine the viewport/ROI 502. Object 504 may be a link, icon, or a specified area on the GUI 500. When the object 504 is selected, the UE 300 determines the center pitch, the center yaw, viewport/ROI size of the viewport/ROI 502 that includes object 504 and provides the center pitch, center yaw, viewport/ROI size to a server such as server 104 of FIG. 1 along with an ID of the user that selected object 504. The object 504 may be selected using a mouse, by touch on a touchpad type device, by tracking a user's gaze using a camera, such as camera 380 that faces a user.

Figure 6:
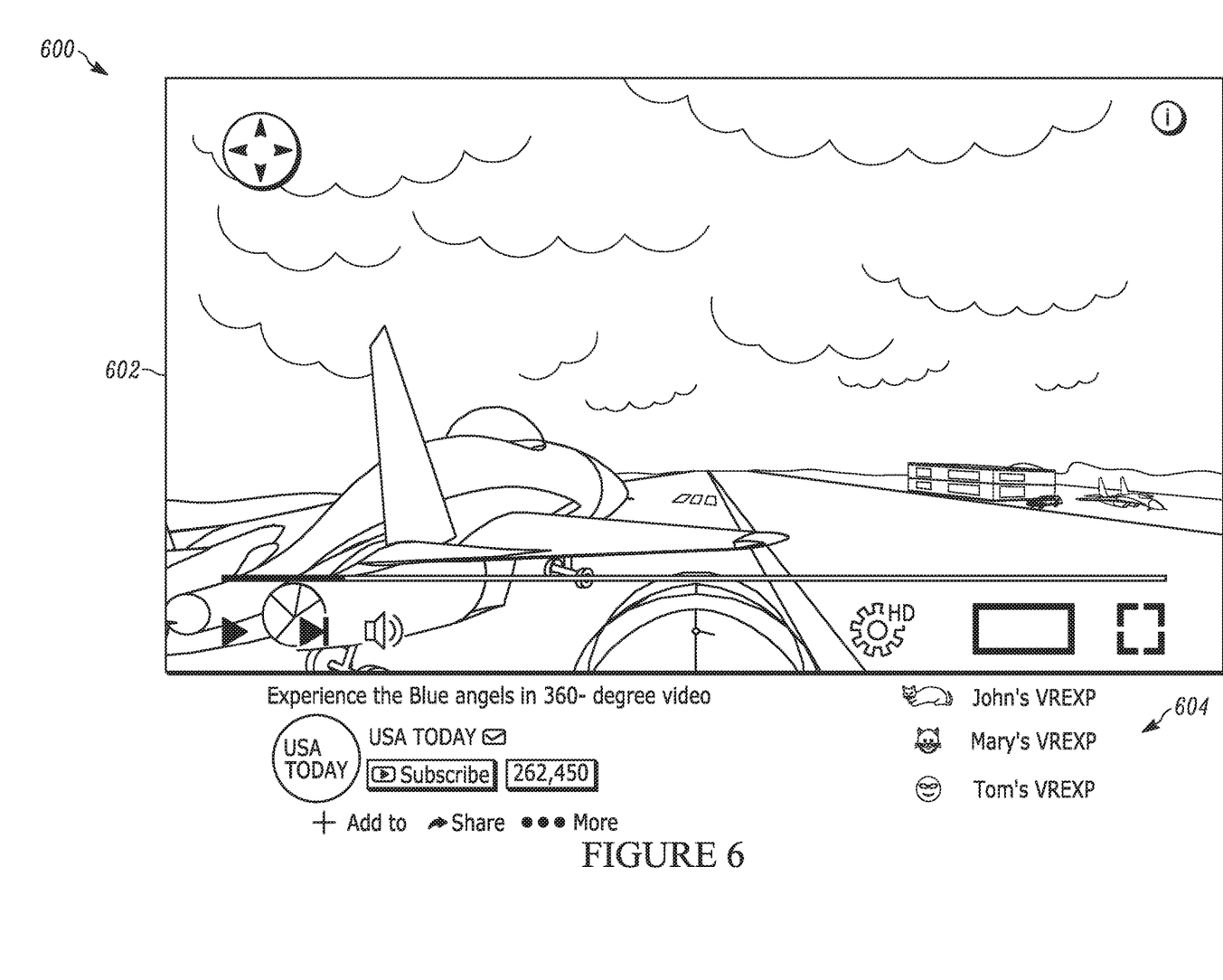
FIG. 6 an example graphical user interface according to this disclosure.

FIG. 6 an example GUI 600 according to this disclosure. In GUI 600, a user may view a specific viewport/ROI 602 of a 360° video. The user may also select a viewport/ROI corresponding to another user using objects 604. The viewport/ROI corresponding to another user may have been predetermined and stored in server 104 or the viewport/ROIs corresponding to another user may be obtained while another user is viewing the same 360° video simultaneously.

Figure 7:
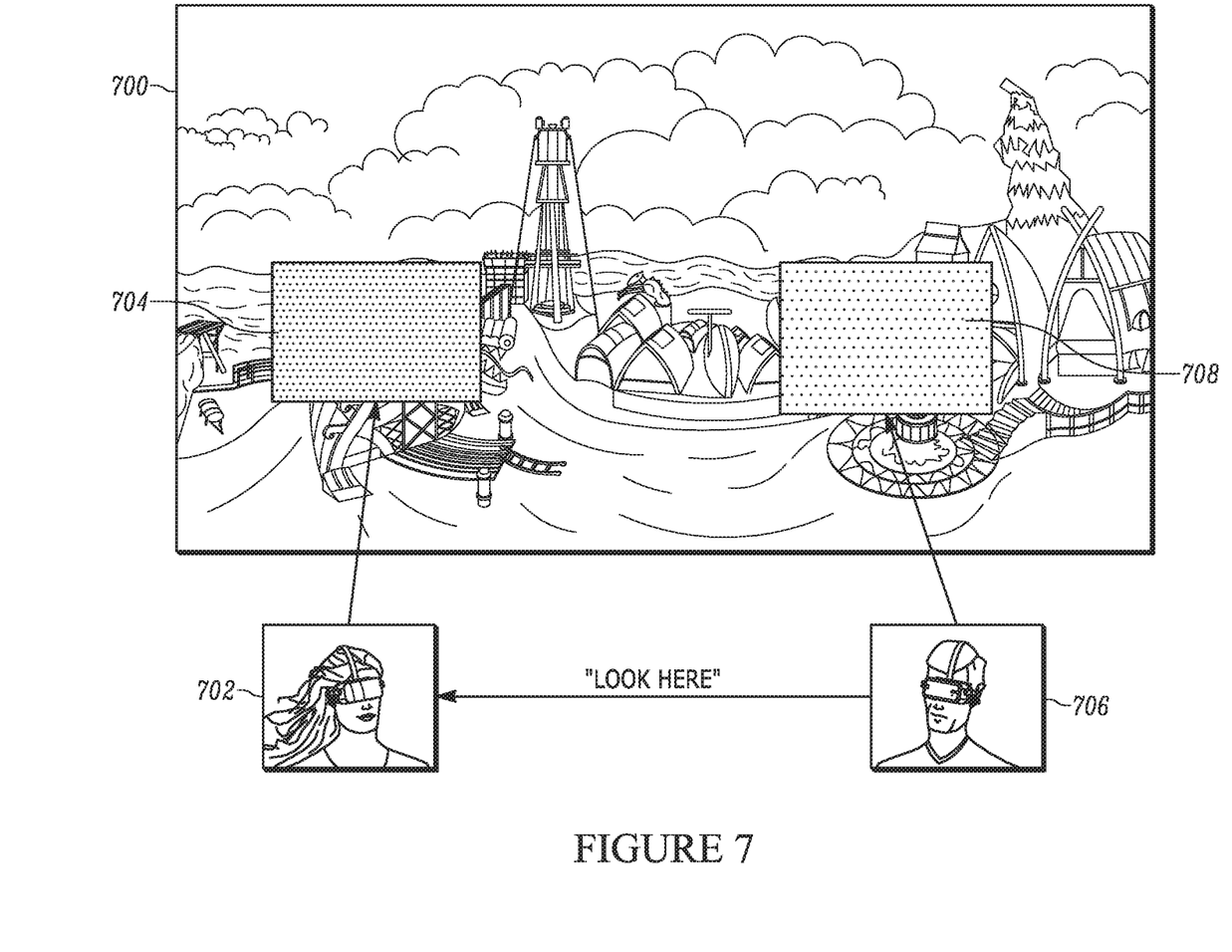
FIG. 7 illustrates an example operation of sharing a viewport/ROI according to this disclosure.

FIG. 7 illustrates an example operation of sharing a viewport/ROI according to this disclosure. As shown in FIG. 7, a first HMD 702 may display viewport/ROI 704 in 360° video 700 while a second HMD 706 may display viewport/ROI 708. A user of the HMD 706 may desire to share viewport/ROI 708 with a user of HMD 702. The user of the HMD 706 may share viewport/ROI 708 by issuing a voice command or by activating an input button, such as input button 421 of FIG. 4. Then HMD 706 transmits the center pitch, center yaw, and viewport/ROI size of the viewport/ROI 708 as metadata to HMD 702 and HMD 702 then displays viewport/ROI 708 instead of viewport/ROI 704. In some embodiments, the viewport/ROI size of HMD 706 may be different than the viewport/ROI size of HMD 702. The HMD 706 may then optionally send its viewport/ROI size to HMD 702 so that HMD 702 can resize the ROI of HMD 706 to look exactly like the viewport/ROI of HMD 706.

Figure 8:
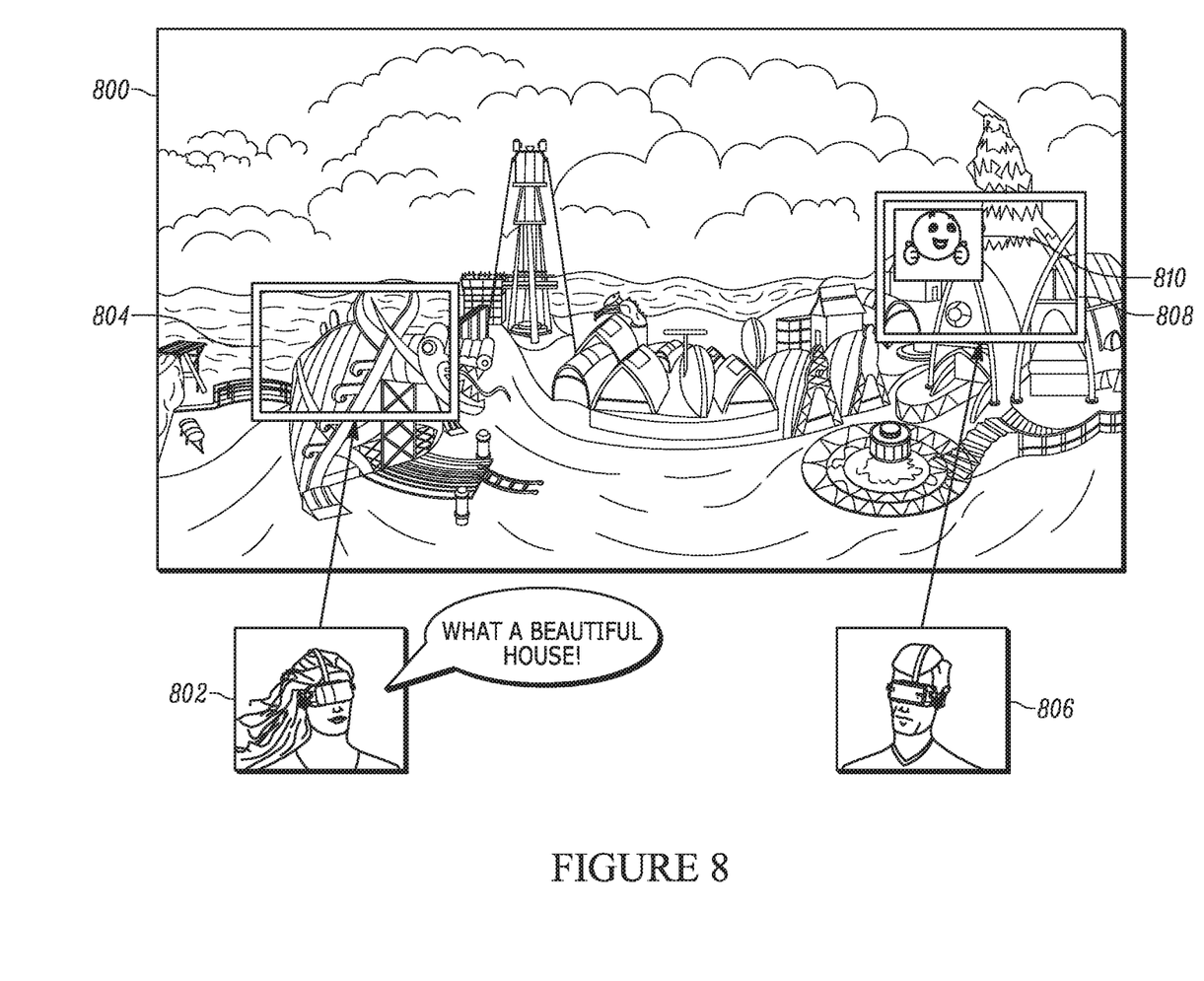
FIG. 8 illustrates an example operation of sharing a viewport/ROI according to this disclosure.

FIG. 8 illustrates an example operation of sharing a viewport/ROI according to this disclosure. As a part of the virtual reality experience, a user could provide verbal commentary on a particular viewport/ROI in the 360° video. The user could also add text, graphics, icons, emojis etc. to annotate the viewport/ROI. Such annotations could be stored along with viewport/ROI the viewport/ROI metadata and the 360° video. A subsequent viewer could then get a combined shared VR experience consisting of viewport/ROI trajectory along with relevant annotated metadata. For example, as shown in FIG. 8, a user of HMD 802 may annotate viewport/ROI 804 with verbal commentary while a user of HMD 806 may annotate viewport/ROI 808 with an emoji 810

Figure 9:
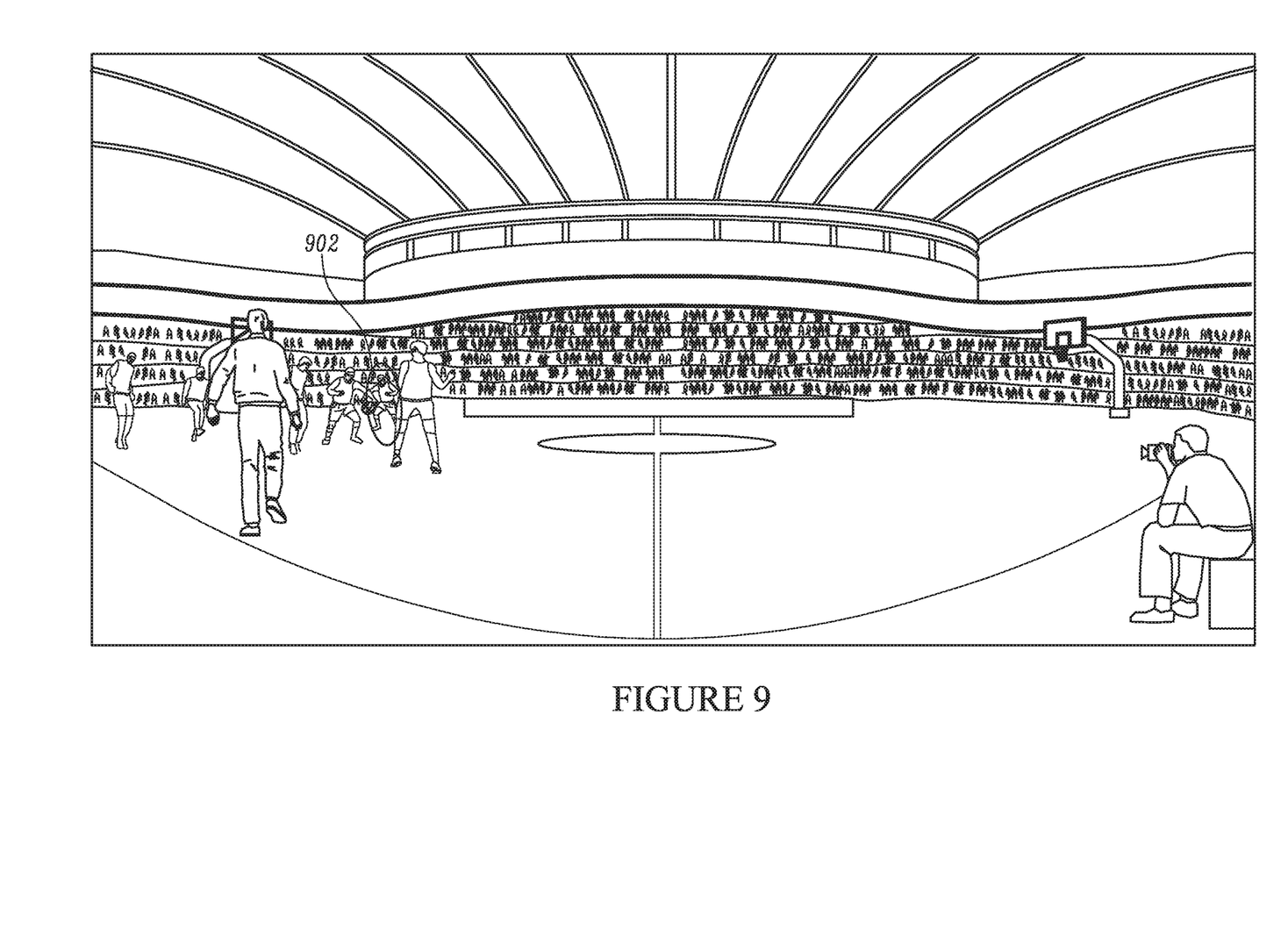
FIG. 9 illustrates an example operation of sharing a viewport/ROI according to this disclosure.

FIG. 9 illustrates an example operation of sharing a viewport/ROI according to this disclosure. In some embodiments, the viewport/ROI information (i.e., center pitch and center yaw, viewport/ROI size) may be generated without substantial user input. For example, as shown in FIGURE, when viewing an event such as sporting event, a user may select a specific player 902. The user may then click on the player in the 360° video. Using computer vision techniques such as people detection, a viewport/ROI can be automatically created with the player being the center of focus. This automatic creation of a viewport/ROI could happen off-line on the server for all players in the game which could be then provided on a web-site for clicking. It could also be done on the HMD viewer in real-time as the viewer clicks on his favorite player in 360° video.

Figure 10:
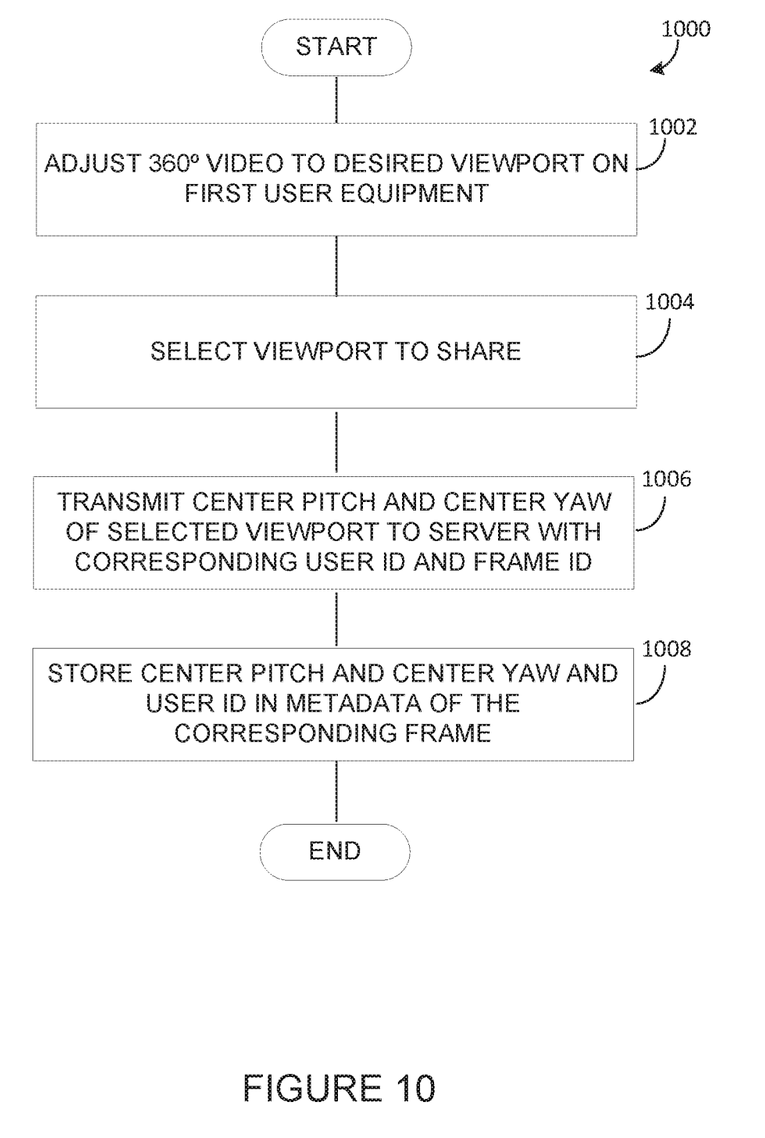
FIG. 10 illustrates a method for sharing a viewpoint according to this disclosure.

FIG. 10 illustrates a method 1000 for sharing a viewpoint according to this disclosure. As shown in FIG. 10, the method 1000 beings in operation 1002 where a user adjusts the 360° video to a desired viewport/ROI. When the UE is an HMD, such as HMD 415, the user merely needs to move their head to adjust the viewport/ROI position. When using an UE such as a phone or tablet, the user may move the orientation of the device to adjust the viewport/ROI or apply an input, such as a touch input on the screen to adjust the viewport/ROI. When using a laptop or desktop computer, the user may use a mouse to adjust the viewport/ROI or a touch input to adjust the viewport/ROI.

In operation 1004, a user may desire to share the current viewport/ROI. When using an HMD, the user may have an input button (e.g., input button 421 of FIG. 4) that when actuated, the HMD stores the center pitch and the center yaw of the current frame in a memory. In other embodiments, a GUI showing the 360° video may include an object that when actuated, stores the center pitch and the center yaw of the current frame in a memory. The object may be actuated using a touch input, a mouse click, or tracking a user's gaze.

In operation 1006, the center pitch, the center yaw, and viewport/ROI size are transmitted to a server, such as server 104 of FIG. 1, as metadata. The metadata also includes a user ID to identify the first user sharing the viewport/ROI and a frame ID so that the server may associate the metadata with the corresponding frame in the corresponding 360° video. In operation 1008, the server stores the center pitch and the center yaw for the corresponding frame in the corresponding 360° video according to user the user ID of the first user so that any other user may retrieve the first user's shared viewport/ROI.

Although the method of FIG. 10 is discussed in relation to a single frame, the UE may capture the center pitch and center yaw for one or more frames in the 360° video and transmits the center pitch and center yaw for each frame to the server 104.

In some embodiments, when the user views only a part of the video, the viewport/ROI is only partially available. The methods in this disclosure can be adapted to support only partial trajectories. Also the viewport/ROI is assumed to be signaled in the form of (center yaw, center pitch, viewport/ROI height, viewport/ROI width), but the ideas described below can be applied to other representations of the viewport/ROI. The complete viewport/ROI without timing information can be signaled at the beginning of the video file. Then for every frame an index number can be signaled that will point to the viewport/ROI number in the viewport/ROI.

The viewport/ROI is defined in terms of the dimension of the viewport/ROI window e.g. (viewport/ROI center pitch, viewport/ROI center yaw, viewport/ROI width, and viewport/ROI height) which is sufficient for a VR experience employing 360° video. For 6 degrees of freedom (DoF) VR, the viewport/ROI will include additional metadata such as the (x, y, z) co-ordinates of the viewer in the virtual world. The (x, y, z) co-ordinates of the viewer represents the position of a viewer in the virtual world using the Cartesian co-ordinates of the virtual world as a frame of reference. The ideas presented in this disclosure are equally applicable to 6 DoF VR.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the applicants to refer to structures known to those skilled in the relevant art and is not intended to invoke 35 U.S.C. § 112(f).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A user equipment (UE) comprising:
 a communication unit configured to receive a video from a server;
 a display configured to render a portion of the video including a region of interest (ROI);
 at least one sensor configured to determine a pitch and a yaw of the portion of the video; and
 a processor configured to generate metadata, the metadata including a flag that represents a value, the pitch, and the yaw, wherein when the value of the flag is a first value, the flag indicates that a frame of the video uses a first set of coordinates for the ROI from a previous frame and when the value of the flag is a second value, the flag indicates that a frame of the video uses a second set of coordinates for the ROI that are interpolated from an anchor frame.

2. The UE of claim 1, wherein the metadata further includes a frame identification that associates the frame to the pitch and the yaw.

3. The UE of claim 2, wherein the metadata further includes a user ID that identifies a user of the UE.

4. The UE of claim 3, wherein the communication unit is configured to transmit the metadata to the server.

5. The UE of claim 1, wherein the communication unit is configured to receive additional metadata including a second pitch and a second yaw generated by another UE, and
 the display is configured to render another portion of the video according to the second pitch and the second yaw.

6. The UE of claim 1, wherein the metadata further includes a second flag configured to indicate whether a size of the ROI is fixed or dynamic.

7. The UE of claim 6, wherein when the second flag indicates the size of the ROI is dynamic, the metadata further indicates a width and a height of the ROI in the portion of the video.

8. The UE of claim 6, wherein when the second flag indicates the ROI is fixed the metadata does not include a width and a height of the ROI in the portion of the video.

9. The UE of claim 1, further comprising an input button configured to retrieve the pitch and the yaw from the at least one sensor when the input button is actuated.

10. A user equipment (UE) comprising:
 a communication unit configured to receive a video from a server;
 a display configured to display a graphical user interface (GUI), the GUI including a rendering of a portion of the video including a region of interest (ROI); and
 a processor configured to:
  determine a pitch and a yaw when the ROI is selected by a user; and
  generate metadata, the metadata including a flag that represents a value, the pitch, and the yaw, wherein when the value of the flag is a first value, the flag indicates that a frame of the video uses a first set of coordinates for the ROI from a previous frame and when the value of the flag is a second value, the flag indicates that a frame of the video uses a second set of coordinates for the ROI that are interpolated from an anchor frame.

11. The UE of claim 10, wherein the metadata further includes a frame identification that associates the frame to the pitch and the yaw.

12. The UE of claim 11, wherein the metadata further includes a user ID that identifies the user of the UE.

13. The UE of claim 12, wherein the communication unit is configured to transmit the metadata to the server.

14. The UE of claim 10, wherein:
the GUI is configured to display at least one ROI corresponding to another user;
the communication unit is configured to receive additional metadata including a second pitch and a second yaw generated by another UE when the at least one ROI is selected; and
the display is configured to render another portion of the video according to the second pitch and the second yaw.

15. The UE of claim 10, wherein the metadata further includes a second flag configured to indicate whether a size of the ROI is fixed or a dynamic.

16. The UE of claim 15, wherein when the second flag indicates the size of the ROI is dynamic, the metadata further indicates a width and a height of the ROI in the portion of the video.

17. The UE of claim 15, wherein when the second flag indicates the ROI is fixed the metadata does not include a width and a height of the ROI in the portion of the video.

18. A method for sharing a portion of a video, the method comprising:
receiving the video from a server;
rendering the portion of the video including a region of interest (ROI);
determining a pitch and a yaw of the portion of the video; and
generating metadata, the metadata including a flag that represents a value, the pitch, and the yaw, wherein when the value of the flag is a first value, the flag indicates that a frame of the video uses a first set of coordinates for the ROI from a previous frame and when the value of the flag is a second value, the flag indicates that a frame of the video uses a second set of coordinates for the ROI that are interpolated from an anchor frame.

19. The method of claim 18, wherein the metadata further includes a frame identification that associates the frame to the pitch and the yaw.

20. The method of claim 19, further comprising transmitting the metadata to the server.

* * * * *